United States Patent [19]
Bennett

[11] 3,754,767
[45] Aug. 28, 1973

[54] INTERCHANGEABLE TOOL MOUNTING DEVICE

[75] Inventor: Gene Lee Bennett, North Madison, Ohio

[73] Assignee: Genio Tools, Inc., Mentor, Ohio

[22] Filed: Sept. 23, 1971

[21] Appl. No.: 183,090

[52] U.S. Cl. .................. 279/14, 29/57 R, 82/33 R, 279/83, 287/108, 287/118
[51] Int. Cl. ...................... B23b 29/00, B23b 29/26
[58] Field of Search .................. 279/1 A, 14, 83, 279/1 R; 408/238, 239, 240; 29/57 R; 287/108, 118; 82/33 R

[56] References Cited
UNITED STATES PATENTS
| | | | |
|---|---|---|---|
| 3,023,015 | 2/1962 | Pankow | 279/14 |
| 1,700,735 | 2/1929 | Brennan | 279/1 R |
| 3,643,546 | 2/1972 | Richter et al. | 279/1 R |

FOREIGN PATENTS OR APPLICATIONS
| | | | |
|---|---|---|---|
| 470,775 | 4/1952 | Italy | 145/62 |

*Primary Examiner*—Francis S. Husar
*Attorney*—Meyer, Tilberry and Body

[57] ABSTRACT

An interchangeable tool mounting device particularly adapted for use with turret lathes in retaining center drills in a desired position. The device includes an elongated body portion having first and second coaxial tool holder receiving passages extending inwardly from the ends thereof. Tool holders which are dimensioned to be closely received in the tool holder receiving passages have tool element receiving passages extending coaxially inward from the ends thereof which are adapted to closely receive different standard sized center drills. By varying the relative disposition of the tool holders within the body portion, a particular sized center drill may be placed in an operative position.

17 Claims, 7 Drawing Figures

Patented Aug. 28, 1973
3,754,767
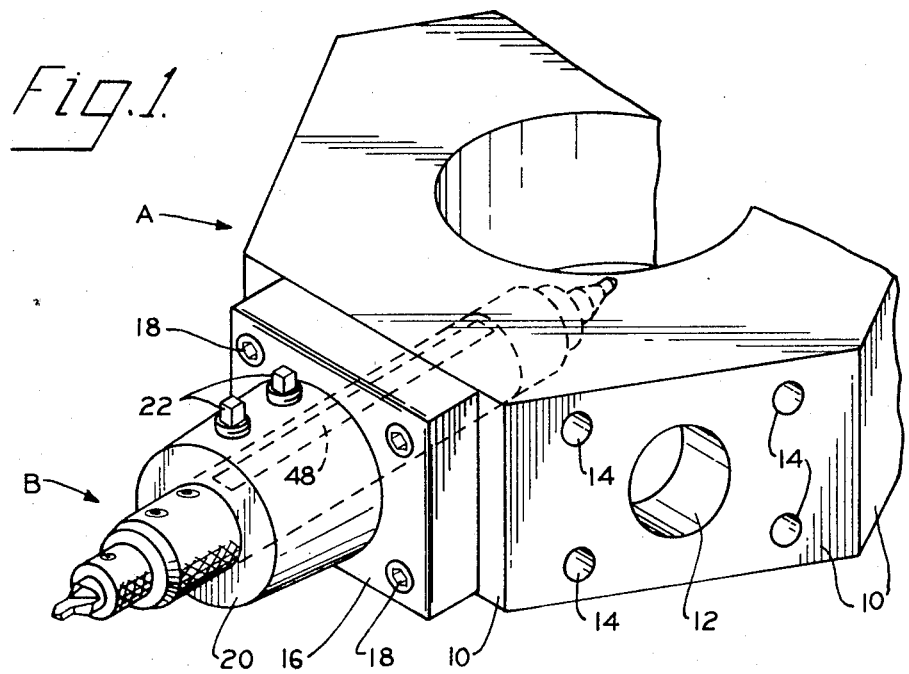
Fig. 1.
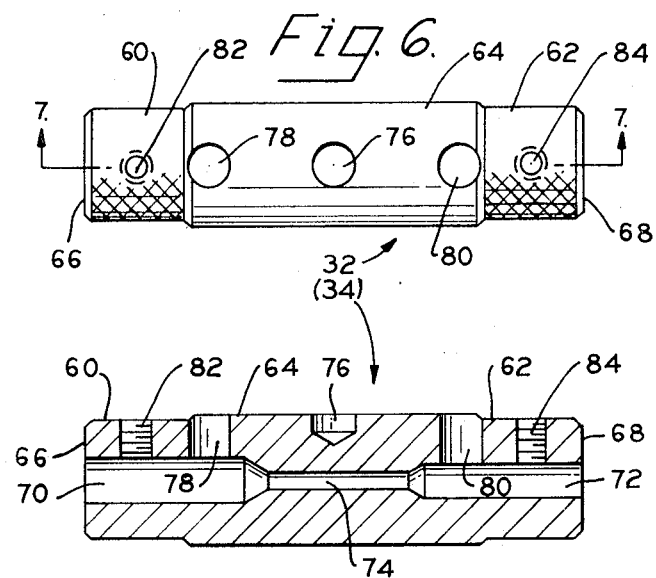
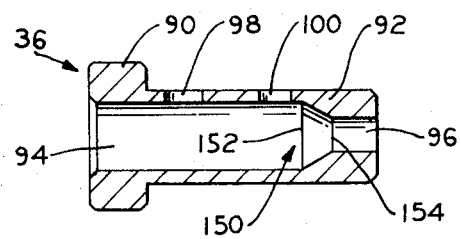
Fig. 4.
Fig. 5.
Fig. 6.
Fig. 7.
INVENTOR.
GENE LEE BENNETT
BY
Meyer, Tilberry & Body
ATTORNEYS.

Patented Aug. 28, 1973

INVENTOR.
GENE LEE BENNETT

BY

Meyer, Tilberry & Body
ATTORNEYS.

INTERCHANGEABLE TOOL MOUNTING DEVICE

This application pertains to the art of material removable machines and more particularly to an interchangeable tool mounting device for use in material removable machines.

The invention is particularly applicable to use with turret latches and will be described with particular reference thereto. However, it will be appreciated that the invention has broader applications and may be employed with other metal removal machinery wherein a plurality of standard tool elements having various standard shank sizes are employed to perform specific functions as dictated by specific workpiece processing requirements.

Heretofore, when cener drills were employed with turret lathe operations, they have been individually mounted to the turret as required and as dictated by the size of the workpiece and the particular machining step to be performed. For each center drill employed, a separate and distinct center drill set-up was therefore necessarily required on the turret. As the center drill tool elements themselves are fairly small, this type of operation necessitated providing storage space and keeping track of these elements which would oftentimes become lost. It will be appreciated that the center drills must be properly located and mounted on the turret in order that they will perform their centering function as desired. As in the case of turret lathe, the center drills must be mounted coaxial with the headstock in order that the workpiece will be mounted and rotated concentrically. Since the center drills themselves are not particularly large, they oftentimes must be "shimmed" into position with periodic adjustments made thereto.

Further, in certain tool room operations, it is common practice to utilize "tool cribs" from where machinists must "check out" various tool elements required to perform a particular machining job. If a certain job requires more than one sized center drill, several trips must be made by the machinist to the "tool crib" in order to obtain the necessary tools. Therefore, valuable machine production time is lost to procuring the necessary center drills on other tool elements to perform the desired machining tasks. Further, and once the desired tool elements are procured, it is still necessary to properly locate and mount them within turret lathe turret in order that the tool elements will perform their desired function.

The present invention contemplates a new and improved device which overcomes all the above referred problems and others and provides an interchangeable tool mounting device which is simple to use, economical to manufacture, and readily adaptable to use with machining operations which require a plurality of different standard sized tool elements.

In accordance with the present invention, there is provided an interchangeable tool mounting device for use in mounting a plurality of tool elements in a desired relationship to a machine. The device comprises an elongated body portion having a longitudinal axis and a first tool holder receiving passage extending coaxially inward from one end thereof having a first cross sectional dimension. The body portion also includes means for releasably retaining it in a desired operating relationship relative to the machine itself. An elongated first tool holder having a longitudinal axis and a second cross sectional dimension less than the dimension of the first tool holder passage permits the first tool holder to be closely received in the first holder passage. The holder further includes a first tool receiving passage extending coaxially inward from one end thereof which is adapted to closely receive a first tool element therein. The device also includes first means for releasably securing the first tool holder in the first tool holder passage and first means for releasably mounting the first tool element in the first tool receiving passage.

In accordance with another aspect of the present invention, the first tool holder includes a second tool receiving passage extending inwardly from the other end thereof coaxial with the first tool holder and the first tool receiving passage and second means for releasably mounting a second tool element in the second tool receiving passage.

In accordance with another aspect of the present invention, there is provided a second elongated tool holder having a longitudinal axis and a second cross sectional dimension for being closely received in the first tool holder receiving passage. The second tool holder includes third and forth tool receiving passages extending inwardly from opposite ends thereof and coaxial therewith. The third and fourth tool receiving passages are adapted to closely receive third and fourth tool elements which are different sizes than the first and second tool elements.

In accordance with yet another aspect of the present invention, the body portion includes a second tool holder receiving passage extending inwardly from the other end thereof from the first tool holder receiving passage and means for releasably securing a tool holder therein.

In accordance with still another aspect of the present invention, the second tool holder receiving passage is of a third cross sectional dimension adapted to closely receive a third tool holder or tool element therein. The third tool holder is in turn adapted to closely receive a fifth tool element.

The principal object of the present invention is the provision of an interchangeable tool mounting device for use with metal removal machines.

Another object of the present invention is the provision of an interchangeable tool mounting device which automatically assures that any of a plurality of tool elements will be desirably aligned with the tool holder when required for use.

Another object of the present invention is the provision of an interchangeable tool mounting device which provides sotrage for these tool elements not in use for a particular machining operation.

Yet another object of the present invention is the provision of an interchangeable tool mounting device which is adaptable for use with tool elements of various types having standard shank sizes.

Still another object of the present invention is the provision of an interchangeable tool mounting device in which the individual tool elements are automatically precisely located within the mounting device.

Yet another object of the present invention is the provision of an interchangeable tool mounting device for use with metal removal machines which is simple to manufacture.

The invention may take physical form in certain parts and arrangements of parts, a preferred embodiment of which will be described in detail in this specification and illustrated in the accompanying drawings which form a part hereof and wherein:

FIG. 1 is a perspective view showing the tool mounting device of the subject invention as mounted in a turret lathe turret;

FIG. 4 is a view of one of the tool holders used with the subject tool mounting device;

FIG. 5 is a cross sectional view taken along lines 5—5 in FIG. 4;

FIG. 6 is a plan view of another type of tool holder employed with the subject tool mounting device; and, FIG. 7 is a cross sectional view taken along lines 7—7 in FIG. 6.

Figure 2:
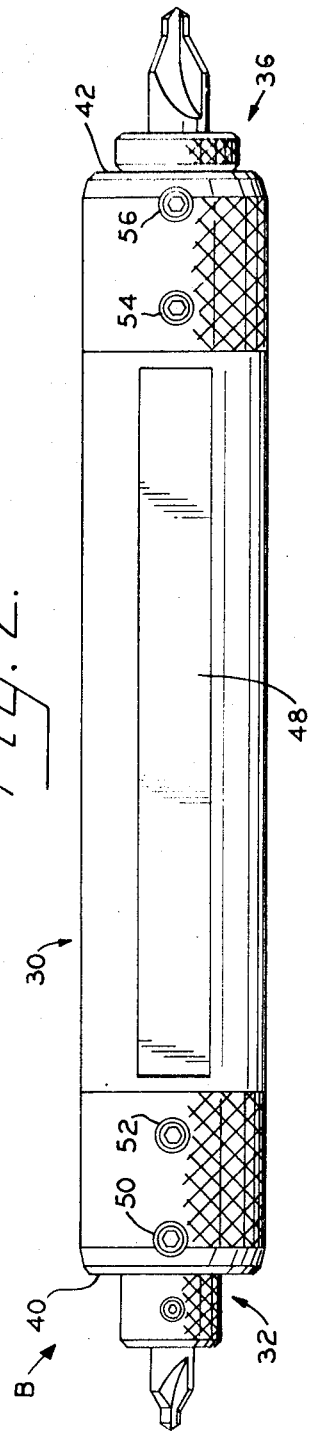
FIG. 2 is a plan view of the tool mounting device of the subject invention.

Referring now to the drawings wherein the showings are for the purposes of illustrating the preferred embodiments of the invention only and not for purposes of limiting same, the Figures show a standard turret portion A of a turret lathe having disposed therein in an operating relationship a tool mounting device B of the type to be more fully described hereinafter.

Turret A includes a plurality of tool mounting faces 10, generally comprised of six faces, each having disposed therethrough a tool receiving hole 12. Disposed about each of the tool mounting faces are a plurality of face plate mounting holes 14. A face plate 16 which has a plurality of mounting holes 18 disposed therein to align with holes 14 provide means for mounting the face plate to the turret by convenient means, such as for example, elongated bolts passing through holes 18 and the associated holes 14. Face plate 16 includes a mounting sleeve 20 extending outwardly therefrom in alignment with the associated tool receiving hole 12 and has a pair of retaining bolts 22 extending therethrough for retaining a tool member in a desired operative relationship therewith. This type of arrangement is generally conventional within the art.

Figure 3:
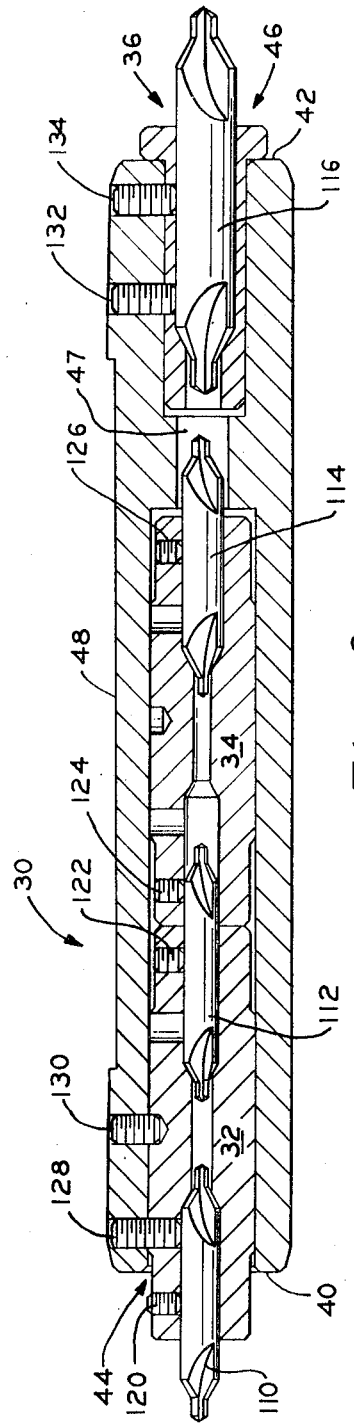
FIG. 3 is a cross sectional view of the tool holder shown in FIG. 2.

Tool mounting device B is generally best shown in FIGS. 2 and 3 and includes a body portion 30 and tool holders 32,34 and 36. Body portion 30 may be constructed from any material acceptable for tool holder use with turret lathe operations which, in the preferred embodiment, comprises hot rolled steel. The body portion is generally cylindrical in cross section and includes ends 40,42 having tool receiving passages 44,46 respectively extending inwardly therefrom. In the preferred embodiments of the invention, the tool receiving passages are cylindrical and coaxial with the longitudinal axis of body portion 30. The tool receiving passages are interconnected at their inside bottom walls by a smaller interconnecting passage 47, the use of which will hereinafter become apparent when considering the use of the tool mounting device. An elongated land area 48 is disposed along the outside wall of body portion 30 to provide means for retaining the tool holder in position in the turret with retaining bolts 22 acting against the land as is conventional. The body portion 30 includes threaded fastener receiving holes 50,52 extending longitudinally therealong in communication with tool receiving passage 44 and threaded fastener receiving holes 54,56 extending longitudinally therealong in communication with tool receiving passages 46. The use of these receiving holes will hereinafter become apparent when description is made to the usage of the tool mounting device.

Referring now to FIGS. 6 and 7, reference will be made to tool holder 32. Holder 32 is also, in the preferred embodiment, constructed from hot rolled steel and includes end portions 60,62 and intermediate portion 64. The end portions have cross sectional dimensions slightly less than the cross sectional dimension of the intermediate portion and the intermediate portion is dimensioned so as to be closely received in a sliding relationship with tool receiving passage 44. End portions 60,62 include end faces 66,68 respectively and extending inwardly toward each other from these end faces are tool receiving passages 70,72 interconnected by an interconnecting passage 74. The diameters of tool receiving passages 70,72 are different from each other in order to closely receive the shank portion of a standard center drill. Disposed longitudinally along intermediate portion 64 is a locating detent 76 and locating and retaining holes 78,80 which communicate with passages 70,72 respectively. Also disposed so as to be longitudinally aligned with the above detent and retaining holes are a threaded fastener receiving hole 82 communicating with tool receiving passage 70 and threaded fastener receiving hole 84 communicating with tool receiving passages 72.

Tool holder 34 is identical to tool holder 32 in physical configuration except that the tool receiving passages 70,72 thereof are different sizes from those in tool holder 32 and from each other. The reasons for this are to accommodate even further different standard shank sizes for other center drills as will hereinafter become apparent.

With reference to FIGS. 4 and 5, tool holder 36 is shown in more detail. Tool holder 36, in the preferred embodiment, is also constructed from hot rolled steel to include a head portion 90 and an elongated end portion 92 dimensioned to be closely received in tool holder receiving passage 46. A tool receiving passage 94 extends from head portion 90 inwardly into end portion 92 and is coaxial therewith. An exit passage 96 extends from the end of the end portion into communication with tool receiving passage 94. Tool receiving passage 94 is dimensioned different from tool receiving passages 70,72 of both tool holders 32,34 to closely receive the shank portion of yet another standard center drill as will hereinafter be more fully described. Extending inwardly longitudinally along end portion 92 in communication with tool receiving passage 94 are a pair of locating and retaining holes 98,100.

Referring again to FIG. 3, tool holders 32,34 are shown as being closely received in tool holder receiving passage 44 with one tool element extending outwardly from the body portion in an operative condition and tool holder 36 is shown as being closely received in tool holder receiving passage 46 with a second, different sized, tool element extending outwardly therefrom in an operative condition. In the FIGURE, tool elements 110,112,114 and 116 are shown in position in tool holders 32,34 and 36. In the preferred embodiment of the invention, these tool elements comprise standard double ended centering drills for particular use with lathes in various turning operations as is conventional within the art. Depending upon the particular workpiece size and operating conditions, different sizes of tool element may be desired to be alternately utilized. Therefore, tool elements 110,112,114 and 116 are all preferred to be of different sizes and the tool receiving passages in tool holders 32,34 and 36 are therefore dimensioned to closely receive one of the standard centering drills in a closely embracing relationship therewith. As is conventional, the shank portion of a center drill increases in diameter as the center drill size itself increases. various standard center drill sizes have been established by the American National Standards Institute for combined drills and countersinks, which sizes are given numerical designations with the smaller center drills having the lower designations ascending therefrom for the larger center drills. Specifically, and in the preferred embodiment, passages 70,72 in tool holder 32 are dimensioned to receive #5 and #2 centering drills respectively. Similarly, passages 70,72 of tool holder 34 are dimensioned to closely receive #4 and #3 centering drills respectively. Tool receiving passage 94 of tool holder 36 is adapted to closely receive a #6 centering drill and tool holder receiving passage 46 is itself dimensioned to closely receive, and with tool holder 36 removed therefrom, a #7 centering drill. Mechanical fasteners which, in the preferred embodiment, comprise allen head set screws, 120,122,124 and 126 are adapted to be threadably received in fastener receiving holes 82,84 of tool holders 32,34. It is therefore merely necessary to insert the proper center drill into its associated tool receiving passage and tighten the associated threaded fastener to a position whereby the center drill is retained in the desired position therein. As seen in FIG. 3, tool holders 32,34 are longitudinally dimensioned so that they both may be simultaneously received within tool holder receiving passage 44. However, it is necessary, at least in the preferred embodiment, to remove one of the center drills associated with one of the tool receiving passages of these two tool holders in order that the outwardly extending end of an adjacent center drill will extend into the open tool receiving passage. In FIG. 3, the outwardly extending end of center drill 112 extends into tool receiving passage 70 of tool holder 34 and the center drill normally associated with that tool receiving passage has been removed therefrom. Depending upon the particular combination or desired center drill to be extending outwardly from body portion 30 in an operative relationship therewith, the specific center drill removed from its associated tool holder may and will vary. In the view of FIG. 3, and to lock tool holder 32 in the desired working relationship with boty portion 30, elongated threaded fasteners 128,130 received in threaded fastener receiving holes 50,52 respectively are utilized. In the preferred embodiment, allen head set screws are employed although other convenient means could be used. It will be seen that fastener 128 passes through locating and retaining hole 78 and against the rear end portion of the shank of center drill 110 and that threaded fastener 130 passes into detent 76. In this manner, the tool holder is retained in a particular predetermined desired position and an additional retaining force is applied against the tool element itself by threaded fastener 138. With this installation, tool element 110 extends coaxially outward from the body portion in its operating condition.

Similarly, and with reference to the installation of tool holder 36 into its associated tool holder receiving passage 46, threaded fasteners 132,134 which are threadably received in threaded fastener receiving holes 54,56 are employed. These threaded fasteners pass through locating and retaining holes 98,100 into engagement with center drill 116 to retain both the holder and the center drill in position relative to body portion 30. In the preferred embodiment, threaded fasteners 132,134 comprise allen head set screws. Again, tool holder receiving passage 46 is dimensioned to receive a #7 center drill itself and, in that instance, threaded fasteners 132,134 act directly against center drill to retain it in position.

Center drills 110,112,114 and 116 are shown as being "double ended" center drills and, for this reason, additional centering devices disposed at the ends of passages 70,72 adjacent interconnecting passages 74 of both tool holders 32,34 and at the end of passage 94 adjacent passage 96 of tool holder 36 are provided. With particular reference to FIG. 5 and the centering device between passages 94,96, it being understood that the remainder of the centering devices are identical thereto except for dimensional alterations, the centering device is generally designated 150. The device comprises tapering the side walls of passages 94,96 to meet each other in the shape of a frustrated cone having a bottom end 152 and a smaller top end 154. With this configuration, and with particular reference to FIG. 3, it will be seen that one end of double ended center drill 116 is closely received in this frustrated conical area with the end point of the tool element extending into passage 96. In this way, tool element 116 is centered within the associated tool holder 36 so that it will be disposed coaxial therewith and with the body portion 30 when the tool holder and center drill are closely received in tool holder receiving passage 46. As the particular bevel of center drill 116 may vary, the particular angled configuration between ends 152,154 of the frustrated conical area may also be varied in accordance with standard center drill dimensions.

Likewise, a stop-like member may be disposed to protrude slightly upwardly from the side wall of the conical zone so as to engage one of the flutes of the center drill disposed in communication therewith. This feature assures that any center drill 116 being used will be received in an identical relationship relative to its tool holder and the body portion which is oftentimes advantageous in turning work.

It should also be noted that in using the subject invention, and again with reference to FIG. 3 and tool holder 32, threaded fastener 120 is first tightened so as to retain the associated center drill 110 in position within the tool receiving channel with the opposite end thereof being received in the association of centering devices 150. When threaded fastener 128 is tightened to pass through receiving and retaining hole 78, it operates against the rear portion of the center drill shank to bias it downwardly to a tight-fitting relationship within the passage and therefore assures that each center drill 110 received therein is located in an identical fashion. This operation holds true for whichever tool holder and associated center drill which is disposed to extend outwardly from end 40 of the body portion.

In using the subject invention, the center drill which is desired to be used for a particular turning operation is first disposed so that it will extend outwardly from the end of body portion 30 with the remainder of the tool holders and center drills disposed similar to that shown in FIG. 3. Once the threaded fasteners have been tightened so as to secure both the tool holder and associated center drill in the desired position, the entire body portion 30 may be positioned within sleeve 20 as shown in FIG. 1. Retaining bolts 22 may then be tightened to a tight-fitting clamping relationship against land 48 of the body portion to retain the entire tool mounting device B in the desired position in turret A. Following a desired machining operation, the center drills may be rearranged as necessary for subsequent machining steps. Wtih the type of interchangeable tool mounting device as hereinabove described, it is assured that each center drill will be coaxially disposed relative to the body portion when it is placed in its operative condition, thus eliminating the need for time consuming aligning processes which have heretofore been required.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A center drill holder comprising; an elongated body member having a longitudinal axis and opposite end portions, a substantially cylindrical bore extending coaxially into said body member from one of said end portions, releasable mounting means on said body member for releasably mounting said body member to a machine, a plurality of center drill holders positioned in said bore, each of said center drill holders having a longitudinal axis and a substantially cylindrical outer surface having substantially the same diameter as said bore, each of said center drill holders having opposite end portions, substantially cylindrical center drill holder bores extending coaxially into each of said opposite end portions of each of said center drill holders, each of said center drill holder bores having a different diameter, at least one of said center drill holders being completely received within said bore in said body member, another of said center drill holders having a major portion thereof completely received in said bore in said body member and having one of said opposite end portions thereof projecting out from said bore in said body member, different size center drills positioned in at least certain of said center drill holder bores including said bore in said one end portion of said other center drill holder, releasable securing means for releasably securing said center drill holders within said bore in said body member, and releasable mounting means for releasably mounting said center drills in said center drill holder bores.

2. The holder of claim 1 wherein said securing means comprises fastener means for securing said other center drill holder to said body member and said other center drill holder retains said one center drill holder within said bore in said body member.

3. The holder of claim 2 wherein said center drill holder bores terminate in tapered bottom ends for substantially mating with tapered ends on said center drills.

4. The holder of claim 1 wherein said center drill holder bores terminate in tapered bottom ends for substantially mating with tapered ends on said center drills.

5. The holder of claim 1 wherein there are two of said center drill holders positioned in said bore in said body member, said two center drill holders having substantially abutting ends within said bore in said body member, said center drill holder bores in said abutting ends receiving opposite end portions of the same center drill.

6. The holder of claim 1 wherein said bore in said body member defines a first bore and further including a second bore extending substantially coaxially into said body member from the other end portion thereof, a center drill holder having a substantially cylindrical outer surface and being releasably secured in said second bore, said second bore having a smaller diameter than said first bore.

7. The holder of claim 1 wherein said opposite end portions of said center drill holders include threaded holes extending substantially radially of said center drill holder bores for receiving set screws to hold center drills in said center drill holder bores, additional holes in said opposite end portions of said center drill holders intersecting said center drill holder bores in spaced relationship to said threaded holes, said body member having a threaded hole in said one end portion thereof extending substantially radially of said bore in said body member for receiving a set screw, one of said additional holes in one of said center drill holders being alignable with said threaded hole in said body member. securing means for releasably securing said center drill holders in said bore in said body member comprises a threaded hole through said one end portion of said body member extending substantially radially of said bore, said center drill holders including a recess in said outer surfaces thereof located substantially centrally between said opposite end portions of said center drill holders, said recess being alignable with said threaded hole in said body member.

9. The holder of claim 1 wherein said releasable securing means for releasably securing said center drill holders in said bore in said body member comprises a threaded hole through said one end portion of said body member extending substantially radially of said bore, said center drill holders including a recess in said outer surfaces thereof located substantially centrally between said opposite end portions of said center drill holders, said recess being alignable with said threaded hole in said body member.

10. A tool holder comprising; an elongated substantially cylindrical body member having opposite end portions and a longitudinal axis, a bore extending substantially coaxially into said body member from one of said end portions thereof, mounting means on said body member for mounting said body member to a machine, a plurality of substantially cylindrical tool holders having longitudinal axes and opposite tool holder end portions, tool holder bores extending substantially coaxially into said opposite tool holder end portions, each of said tool holder bores having a different diameter, said tool holders being receivable in said bore in said body member with said longitudinal axis of said body member substantially coincidental with said longitudinal axes of said tool holders, each of said tool holders having a substantially common predetermined length and opposite ends, said bore in said body member having a bottom, releasable securing means for securing one of said tool holders in working position within said bore in said body member with one of said ends of said one tool holder extending outwardly from said bore in said body member and the other of said ends positioned in said bore in said body member, the distance from said other end of said one tool holder to said bottom of said bore in said body member being at least as great as said predetermined length of said tool holders.

11. The holder of claim 10 and including releasable mounting means on said tool holders adjacent said opposite end thereof for releasably mounting tools in said tool holder bores, said releasable mounting means adjacent said one end of said one tool holder being accessible externally of said body member when said one tool holder is releasably secured in said working position in said bore in said body member.

12. The holder of claim 11 wherein said tool holder bores have tapered bottom ends for mating with tapered ends on tools received in said bores.

13. A substantially cylindrical elongated tool holder having a longitudinal axis and opposite end portions, cylindrical bores extending coaxially into said opposite end portions, said bores having different diameters and inwardly tapered bottom ends located in spaced-apart relationship, and releasable mounting means for releasably mounting tools within said bores, said tools having cylindrical shanks and tapered opposite working portions, said tools being reversible within said bores with one of said working portions extending outwardly from said bores and the other ends mating with said tapered bottom ends.

14. The holder of claim 13 wherein said holder has opposite ends and an outer surface, and further including a cylindrical securing recess in said outer surface located substantially centrally between said opposite ends.

15. The holder of claim 14 wherein said releasable mounting means comprises a threaded hole through each of said opposite end portions spaced inwardly from said opposite ends and extending substantially radially of said bores.

16. The holder of claim 15 and further including additional unthreaded holes through said opposite end portions to said bores and located intermediate said recess and said threaded holes.

17. The holder of claim 13 wherein said holder has an outer surface including a central portion and said opposite end portions, said outer surfaces of said opposite end portions having a smaller diameter than said central portion, said central portion having a length substantially greater than said either of said opposite end portions.

* * * * *